United States Patent
Mastrangelo et al.

(10) Patent No.: US 9,670,343 B2
(45) Date of Patent: Jun. 6, 2017

(54) OLEFIN-ACRYLATE POLYMERS IN REFINERY AND OILFIELD APPLICATIONS

(71) Applicant: The Lubrizol Corporation, Wickliffe, OH (US)

(72) Inventors: Antonio Mastrangelo, Alfreton (GB); Timothy R. Smith, Belper (GB); Christopher J. Kolp, Mayfield Village, OH (US); John R. Johnson, Bainbridge, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 14/650,375

(22) PCT Filed: Dec. 4, 2013

(86) PCT No.: PCT/US2013/072946
§ 371 (c)(1),
(2) Date: Jun. 8, 2015

(87) PCT Pub. No.: WO2014/093067
PCT Pub. Date: Jun. 19, 2014

(65) Prior Publication Data
US 2015/0307697 A1     Oct. 29, 2015

Related U.S. Application Data

(60) Provisional application No. 61/735,240, filed on Dec. 10, 2012.

(51) Int. Cl.
*C08L 23/08*    (2006.01)
*C10L 1/196*    (2006.01)
*C10L 10/16*    (2006.01)

(52) U.S. Cl.
CPC ......... *C08L 23/0869* (2013.01); *C10L 1/1963* (2013.01); *C10L 10/16* (2013.01)

(58) Field of Classification Search
CPC .................................................. C08L 23/0869
USPC .................................................. 524/555, 562
See application file for complete search history.

(56) References Cited

U.S. PATENT DOCUMENTS

| | | |
|---|---|---|
| 4,284,414 A | 8/1981 | Bryant |
| 4,419,106 A | 12/1983 | Miller |
| 4,664,676 A | 5/1987 | Denis et al. |
| 6,066,603 A | 5/2000 | Emert et al. |
| 6,750,305 B2 | 6/2004 | Gateau et al. |
| 7,942,941 B2 | 5/2011 | Cravey et al. |
| 8,067,349 B2 | 11/2011 | Stoehr et al. |
| 2010/0280198 A1 | 11/2010 | Bartley et al. |
| 2012/0136109 A1 | 5/2012 | Pafford, IV et al. |

FOREIGN PATENT DOCUMENTS

| | | |
|---|---|---|
| CN | 1088962 | 7/1994 |
| DE | 102005008442 | 2/2006 |
| WO | 2006/111326 | 10/2006 |

OTHER PUBLICATIONS

International Search Report for PCT/US13/072946, mailed on Mar. 24, 2012.
Written Opinion of the International Searching Authority (EPO) for PCT/US13/072946, mailed Mar. 24, 2012.

*Primary Examiner* — Edward Cain
(74) *Attorney, Agent, or Firm* — Christopher P. Demas; Teresan W. Gilbert

(57) ABSTRACT

The present invention relates to materials useful for lowering the pour point of wax-containing mixtures of liquid hydrocarbons, as well as compositions of and methods for preparing the same. More particularly, this invention relates to the use in liquid hydrocarbons of OLAC compositions containing units derived from (i) hydrocarbyl(meth)acrylic acid derivatives and (ii) ethylenically unsaturated aliphatic Nα-olefin monomers having up to 50 carbon atoms. The OLAC compositions are useful for modifying the fluidity and flow characteristics of liquid hydrocarbons, and more particularly, for improving the pipeline pumpability of liquid hydrocarbons.

12 Claims, No Drawings

OLEFIN-ACRYLATE POLYMERS IN REFINERY AND OILFIELD APPLICATIONS

CROSS REFERENCE TO RELATED APPLICATION

This application claims priority from PCT Application Serial No. PCT/US2013/072946 filed on Dec. 4, 2013, which claims the benefit of U.S. Provisional Application No. 61/735,240 filed on Dec. 10, 2012.

BACKGROUND OF THE INVENTION

The present invention relates to materials useful for lowering the pour point of wax-containing mixtures of liquid hydrocarbons, as well as compositions of, and methods for preparing the same. More particularly, this invention relates to methods of using and the use in liquid hydrocarbons of compositions containing units derived from (i) hydrocarbyl (meth)acrylic acid derivatives and (ii) ethylenically unsaturated aliphatic α-olefin monomers having up to 50 carbon atoms. The compositions can be mixtures and/or copolymer compositions and are useful for modifying the fluidity and flow characteristics of liquid hydrocarbons, and more particularly, for improving the pipeline pumpability of liquid hydrocarbons.

Crude oil production provides one example of issues flowability of liquid hydrocarbon compositions. Offshore crude oil production often necessitates the flow of crude oil through undersea pipelines. Sub-sea temperatures can be and often are as low as approximately 4° C. Crude oils contain components, such as, for example, paraffins, alkanes, etc., that at these low temperatures tend to precipitate as large crystals. These crystals can agglomerate to form a gel structure which can precipitate in the pipe, causing a reduction in the flow rate of the crude oil through the pipe.

The problems with wax creation in crude oil, among other liquid hydrocarbons, have led to chemical and mechanical methods for removing the wax deposits. However, mechanical methods in particular often result in equipment downtime, meaning loss of production, and increased engineering costs. Accordingly, effective chemical methods, in which chemical additives are fed into the pipe lines are often more desirable. A number of additives are known in the art, and include wax crystal modifiers such as pour point depressants and wax dispersants. These chemical additives depress the temperature of formation of the wax crystals and can modify the wax morphology (for example, by reducing the size of the crystals that form) thereby reducing the propensity of the wax to adhere to the pipe-line walls or block filters.

A large portion of the prior art references in this area teach pour point depressants comprising maleic anhydride, among which references include, for example, U.S. Pat. Nos. 3,536,461; 3,574,575; 3,879,177 and 4,284,414. Some references teach the use of acrylate type polymers including, for example, U.S. Pat. Nos. 6,255,261; 6,750,305; 8,067,349; and 8,143,202.

There is a continual need to produce more effective polymers giving improved performance in liquid hydrocarbon compositions. For example, oil companies are encountering crude oils that are increasingly more difficult to handle. Generally these oils have higher pour points and increasing wax content (amount and chain length of paraffins, alkanes, etc.), meaning that new and more effective chemistries are required.

SUMMARY OF THE INVENTION

Types of olefin-acrylate (OLAC) copolymers are known in the prior art, for example, as taught in U.S. Publication No. 2012/0136109 to Pafford IV, et al., published May 31, 2012. It has now been found that incorporation of olefins in the OLAC composition can give an improvement over the pure polyacrylate in liquid hydrocarbon compositions, such as, for example, high-, mid-, and low-wax crude oils and heavy fuels, for example.

In one embodiment, the disclosed technology, solves the problem of the agglomeration and subsequent crystallization of long chain ($\geq C_{18}$) n-paraffins in liquid hydrocarbon compositions by introducing OLAC mixtures into the liquid hydrocarbon composition.

In one embodiment, there is provided a pour point depressant additive. The additive can comprise (a) at least one OLAC composition and (b) a hydrocarbon solvent.

In another embodiment, there is provided a liquid hydrocarbon composition, for example, a crude oil composition, comprising (a) at least one OLAC composition, (b) a hydrocarbon solvent, and (c) a liquid hydrocarbon composition, such as crude oil.

In one embodiment, the OLAC composition useful in the pour point depressant or liquid hydrocarbon composition can comprise a reaction product of (a1) at least one alpha olefin and (a2) at least one hydrocarbyl(meth)acrylic acid derivative. In another embodiment, the OLAC composition useful in the pour point depressant or liquid hydrocarbon composition can comprise monomers derived from (a1) at least one alpha olefin with (a2) at least one hydrocarbyl (meth)acrylic acid derivative.

In some embodiments, the at least one alpha olefin (a1) of the OLAC composition can comprise from 2 to about 50 carbon atoms.

In some embodiments, the hydrocarbyl(meth)acrylic acid derivative of (a2) of the OLAC composition can be an ester or an amide, such as, for example, a hydrocarbyl(meth)acrylate, hydrocarbyl(meth)acrylamide, or combinations thereof. In other embodiments, the derivatives can be a combination of esters. In further embodiments the derivatives can be a combination of amides. In still further embodiments, the derivative can be a combination of at least one ester and at least one amide.

In some embodiments, the hydrocarbyl group of the hydrocarbyl(meth)acrylic acid derivative of (a2) (e.g., the hydrocarbyl(meth)acrylate, hydrocarbyl(meth)acrylamide, or combinations thereof) can be an alkyl group, an aminoalkyl group, or an aryl group. In some embodiment, the hydrocarbyl substituent of (a2) can contain from 4 to about 50 carbon atoms.

In an embodiment the hydrocarbyl(meth)acrylic acid derivative of (a2) can be an alkyl(meth)acrylate, alkyl(meth) acrylamide, aminoalkyl(meth)acrylate, amino alkyl(meth) acrylamide, aryl(meth)acrylate, aryl(meth)acrylamide, or combinations thereof.

In some embodiments of the OLAC composition, when the hydrocarbyl group of the hydrocarbyl(meth)acrylic acid derivative of (a2) comprises less than 16 carbon atoms, the at least one alpha olefin of (a1) comprises greater than 16 carbon atoms.

In other embodiments of the OLAC composition, when the at least one alpha olefin of (a1) comprises less than 16 carbon atoms, the hydrocarbyl group of the hydrocarbyl (meth)acrylic acid derivatives of (a2) comprises greater than 16 carbon atoms.

In an embodiment, the OLAC composition can comprise a compound of Formula 1

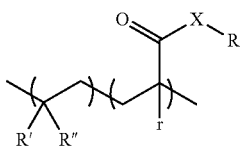

Formula 1 where either of R' and R" can be H or an alkyl group of 1 to 48 carbon atoms, with the proviso that R' and R" together have no more than 48 carbon atoms, R is an alkyl, aminoalkyl group, or aryl group of 4 to 50 carbon atoms, r is H or $CH_3$, and X is O or NR''', where R''' is H or an alkyl group of 1 to 10 carbon atoms.

In certain embodiments, either the reaction to produce the OLAC composition or the OLAC composition can comprise from about 1 to about 50 wt. % of the at least one alpha olefin of (a1) and from about 50 to about 99 wt. % of the at least one hydrocarbyl(meth)acrylic acid derivatives of (a2).

In one embodiment, there is provided a method of depressing the pour point of a liquid hydrocarbon composition, such as a crude oil composition. The method comprises adding to the liquid hydrocarbon composition (e.g. the crude oil composition) an OLAC composition as disclosed herein suitable for depressing the pour point of the liquid hydrocarbon composition, such as, for example, an OLAC composition comprising a reaction product of, or monomers derived from, (a1) at least one alpha olefin, and (a2) at least one hydrocarbyl(meth)acrylic acid derivative; or an OLAC composition according to formula 1.

DETAILED DESCRIPTION OF THE INVENTION

Various preferred features and embodiments will be described below by way of non-limiting illustration.

As used herein, bracketed "(meth)" means a methyl group may or may not be present. For example, (meth)acrylic acid can refer to both acrylic acid and methacrylic acid.

One aspect of the invention is a liquid hydrocarbon composition, for example a crude oil composition, comprising (a) at least one OLAC composition and (b) a hydrocarbon solvent. The at least one OLAC composition can be an OLAC polymeric product or mixture resulting from reacting (a)(1) at least one ethylenically unsaturated olefin monomer(s) having 2, 3 or 4 to 50 carbon atoms, and (a)(2) at least one hydrocarbyl(meth)acrylic acid derivative. Polymerization generally takes place in the presence of a free radical initiator.

The ethylenically unsaturated olefin monomer(s) can be alpha-beta unsaturated olefins, more commonly referred to as alpha olefins, having in one embodiment from 2, 3 or 4 to 50 carbon atoms, in another embodiment from 8 to 40 carbon atoms, and in a third embodiment desirably 10 or 12 to 30 carbon atoms.

In one embodiment, the alpha olefin monomer(s) do not include any atoms other than carbon and hydrogen, i.e., they are entirely hydrocarbon. In one embodiment, the formula of these molecules is $CH_2=CR'R"$ where R' and R" are independently H or an alkyl of 1, 2 or 3 to 48 carbon atoms, or 6 to 38 carbon atoms, and preferably from 8 or 10 to 28 carbon atoms, that may be linear, branched or cyclic, with the proviso that R' and R" together have no more than 48 carbon atoms. In one embodiment, it is desirable that R" is a linear or branched alkyl of 1 to 4 carbon atoms and R' is a linear or branched alkyl of 1 to 47 carbon atoms. Olefins where both R' and R" are $C_1$ or higher are believed to be more co-polymerizable with the other monomers than olefins where one of R' or R" is hydrogen. Examples of alpha olefins in which R' and R" are $C_1$ or higher include 2-methylalkyl-1-enes, such as, for example, 2-methyltetradec-1-ene, 2-methylicos-1-ene, 2-methyltetracos-1-ene.

Other example alpha olefins suitable in the invention include butylene, isobutylene, diisobutylene, pentene, hexene, octene, dodecene, tetradecene, hexadecane, icosene, henicosene, docosene, octatetracontene, and other linear and branched olefins. In a preferred embodiment, the alpha olefin is linear and un-branched.

It is desirable that at least 1 wt. % to about 49 or 50 wt %, and in another embodiment from 5 to about 45 wt. %, and in further embodiments, from 10 or 20 to about 40 wt % of the composition comprises repeating units derived from said alpha olefin monomer(s). In other embodiments, the composition can comprise repeat units derived from said alpha olefin monomer(s) at about 1, 10, or 20 wt. % and up to 80, 90 or 99 wt. % of the compositions.

The hydrocarbyl(meth)acrylic acid derivatives can be hydrocarbyl methacrylic acid derivatives or hydrocarbyl acrylic acid derivatives. In a preferred embodiment, the hydrocarbyl(meth)acrylic acid derivatives are hydrocarbyl acrylic acid derivatives.

The hydrocarbyl(meth)acrylic acid derivatives can be esters or amides. In one embodiment, the OLAC compositions can comprise, or in some cases consist of, or consist essentially of, a combination of hydrocarbyl(meth)acrylates and hydrocarbyl(meth)acrylamides. In another embodiment, the OLAC compositions can comprise, or in some cases consist of, or consist essentially of, a combination of at least one hydrocarbyl(meth)acrylate. In a further embodiment, the OLAC compositions can comprise, or in some cases consist of, or consist essentially of, a combination of at least one hydrocarbyl(meth)acrylamide.

The hydrocarbyl group of the hydrocarbyl(meth)acrylic acid derivatives is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

In a preferred embodiment, the hydrocarbyl group of the hydrocarbyl(meth)acrylic acid derivatives can be an alkyl group, aminoalkyl group or aryl group. In one embodiment, the OLAC composition comprises at least one of an alkyl (meth)acrylate, aminoalkyl(meth)acrylate, aryl(meth)acrylate, or a combination thereof. In another embodiment, the OLAC composition comprises at least one of an alkyl(meth)acrylamide, aminoalkyl(meth)acrylamide, aryl(meth)acrylamide, or a combination thereof. In other embodiments, the OLAC composition can comprise, a combination of alkyl (meth)acrylic acid derivatives, aminoalkyl(meth)acrylic acid derivatives, and aryl(meth)acrylic acid derivatives. The OLAC composition can also comprise, or in some cases consist of or consist essentially of one of, or a mixture of one of, an alkyl(meth)acrylic acid derivative, aminoalkyl(meth) acrylic acid derivative, or aryl(meth)acrylic acid derivative. For example, in one embodiment, the OLAC composition can comprise, or in some cases consist of, or consist essentially of, a single ester or a mixture of esters. In one embodiment, the OLAC composition can comprise, or in some cases consist of, or consist essentially of, a single amide or a mixture of amides. In other embodiments, the OLAC compositions can comprise a mixture of both esters and amides.

Specific examples of the hydrocarbyl(meth)acrylic acid derivatives can include those having the Formula I:

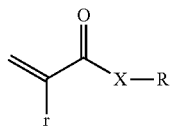

Formula I wherein r is hydrogen or a methyl group, X is O or NR''', R''' is H or an alkyl of from 1 to about 10 carbon atoms, more preferably 1 to about 8, or 1 to about 6 carbon atoms, and R is an alkyl, aminoalkyl, or aryl group having from 4 or 6 to 50 carbon atoms, more typically 8 to 40 carbon atoms or 10 or 12 to 30 carbon atoms. R and r can optionally also comprise one or more sulfur, nitrogen, phosphorus, silicon, halogen or oxygen atoms in addition to carbon atoms.

In one embodiment, R may be derived from an alcohol; preferably a primary alcohol branched at the beta- or higher position. In one embodiment a primary alcohol branched at the beta- or higher position suitable from which to derive R herein may be a Guerbet alcohol. Methods to prepare Guerbet alcohols are disclosed in U.S. Pat. No. 4,767,815 (see column 5, line 39 to column 6, line 32). Examples of suitable primary alcohols branched at the beta- or higher position include 2-ethylhexanol, 2-butyloctanol, 2-hexyldecanol, 2-octyldodecanol, 2-decyltetradecanol, or mixtures thereof.

Examples of suitable alkyl groups for the alkyl(meth) acrylates or alkyl(meth)acrylamides include n-butyl-, isobutyl-, tert-butyl-, sec-butyl-, n-amyl-, n-hexyl-, isoamyl-, 4-hydroxybutyl-, glycidyl-, allyl-, 2-n-butoxyethyl-, 2-ethylbutyl-, octadecyl-, icosyl-, crotyl-, cyclohexyl-, cyclopentyl-, n-octyl-, dodecyl-, docosyl-, triacontyl-, tetracontyl-, pentacontyl-, and the like.

Examples of suitable aminoalkyl groups for the aminoalkyl(meth)acrylates or aminoalkyl(meth)acrylamide include N,N-dimethylaminoethyl-, N,N-diethylaminoethyl-, t-butylaminoethyl-, and the like.

Examples of suitable aryl groups for the aryl(meth)acrylate or aryl(meth)acrylamide include benzyl-, cinnamyl-, furfuryl-, 2-phenoxyethyl-, napthene-2-yl-, 3-benzylphenyl-, 2-phenylethyl-, phenyl-, and the like.

Mixtures of acrylic and methacrylic acids may be used, as well as mixtures of alkyls, mixtures of aminoalkyls, mixtures of aryls, and mixtures of two or more of alkyls, aminoalkyls, and aryls. In a preferred embodiment the derivative is an alkyl(meth)acrylate.

The OLAC compositions can comprise OLAC mixtures and/or OLAC copolymers. The polymerized derivative of acrylic and/or methacrylic acid (i.e. repeating units therefrom) typically may comprise at least 1, 10, or 20 wt. % and up to 80, 90 or 99 wt. % of the copolymer, and preferably from about 50 or 51 to 99 wt. %, or in another embodiment from 55 to 95 wt. %, and in a third embodiment from 60 to about 80 or 90 wt. % depending on the amount of alpha olefin desired in the copolymer composition.

In an embodiment, the reaction product of the a) at least one ethylenically unsaturated olefin monomer(s) and b) at least one hydrocarbyl(meth)acrylic acid derivative can comprise a polymeric unit of Formula 1,

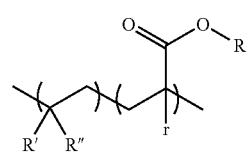

Formula 1 where R', R'', R and r are as defined above.

A specific example embodiment of the reaction product can be that of formula a.

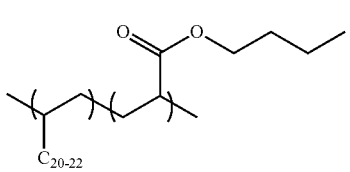

formula a

Another specific example embodiment of the reaction product can be that of formula b.

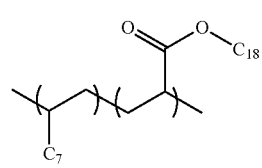

formula b

A further specific example embodiment of the reaction product can be that of formula c.

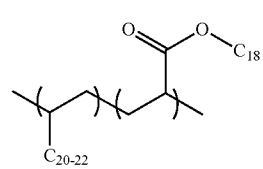

formula c

The OLAC compositions can be prepared by simple mixing or by free radical initiation processes known in the art and with a free radical initiator selected from any known to those in this art.

In one embodiment, the copolymer compositions from this process desirably have a number average molecular weight in excess of 2,000; more desirably in excess of 3,000 or 5,000; and in other embodiments desirably in excess of 10,000; 25,000; 50,000; or 100,000 grams per mole, up to about 300,000; 250,000; 225,000; or 200,000. Molecular weights as stated will be determined by GPC analysis using polystyrene standards. Typically, the weight average molecular weight of many polymers and polymerization mechanisms will be about double the number average molecular weight. In one embodiment, desirably these copolymers will have a weight average molecular weight in excess of 4,000; more desirably in excess of 6,000 or 10,000; and in other embodiments desirably in excess of 20,000; 50,000; 100,000; or 200,000 grams per mole, up to about 500,000; 250,000; 225,000; or 200,000.

The polymerization mechanism can be any of those known to the art (e.g., dispersion, emulsion, bulk, solution, etc). In one embodiment, it is desirable for ease of handling of the polymer that the final copolymer (e.g., in aqueous media) be a dispersion that can be pumped and handled as a liquid.

Typically, one wants both co-monomers to be chemically bonded into the same polymer chain, unless one wants an interpenetrating polymer network of two separate polymers. The copolymers can have randomly inserted monomers, alternating insertion of monomers, blocky insertion of repeating units from a single monomer, etc. As one goes from blocky insertion to random to perfectly alternating insertion, the percentage of any first type of repeating unit adjacent to another type of repeating unit increases. In one embodiment, desirably at least 5, 10, 15 or 20 weight percent of the repeating units from said hydrocarbyl(meth)acrylic acid derivative are covalently bonded to at least one repeating unit from said alpha olefin. Similarly, in one embodiment, desirably at least 5, 10, 15 or 20 weight percent of the repeating units from said alpha olefin are covalently bonded to repeating units from said hydrocarbyl(meth)acrylic acid derivative.

In one embodiment of the OLAC composition, up to 20% of the initial charge of the alpha olefin can remain unreacted, more preferably up to 18% or up to 16%. Preferably 15% or less, or 10% or less, and even 5% or less of the initial alpha olefin is unreacted in the OLAC composition. Most preferably all of the alpha olefin is reacted in the OLAC composition. In some embodiments, the OLAC composition can comprise a homopolymer or copolymer of the at least one alpha olefin, and/or a homopolymer or copolymer of the at least one hydrocarbyl(meth)acrylic acid derivative.

The above-described OLAC compositions are suitable for modifying the flow characteristics of liquid hydrocarbon compositions. The liquid hydrocarbon is an oil and includes aliphatic or liquid aromatic hydrocarbons. The hydrocarbon may be a crude oil, black oil or a non-volatile fraction from a distillation of a crude oil. The hydrocarbon may also be a heavy fuel such as a heavy distillate heating oil or marine/industrial fuel oil, including bunker fuel. The hydrocarbon may also be any petrochemical process oil which has a propensity to form asphaltenic and ultimately coke-like species at surfaces under high temperature conditions. In one embodiment, the hydrocarbon fluid is an oil field product, e.g., a whole well product or a multiphase mixture in or from a well bore or one at a well head after at least partial separation of gas and/or water, for instance, an oil export fraction. In one embodiment, the hydrocarbon fluid is a refinery or petrochemical process stream or a heavy distillate or residual fuel.

The hydrocarbon may contain at least 0.01 wt % of asphaltene, in another embodiment up to a maximum of 30 wt % of asphaltene. Examples of suitable ranges of asphaltene present in the hydrocarbon fluid include up to 90 wt % or 0.001 wt % to 90 wt %, 0.01 wt. % to 70 wt % or 0.04 to 50 wt % or 0.06 to 30 wt %. In one embodiment, the asphaltene content is up to 90 wt %. Generally, higher asphaltene content is present in an oil shale, bitumen or asphalt.

The hydrocarbon fluid may further comprise gas present from 0 wt % to 10 wt % or water (or water droplets) from 0 wt % to 20 wt %. The hydrocarbon fluid in one embodiment has multiple phases between the oil and gas and/or water.

The hydrocarbon fluid comprises paraffin wax, often present from 0 wt % to 35, 40 and even 50 wt %, or 0.5 wt % to 30 wt % or 1 wt % to 15 wt %. High wax liquid hydrocarbon compositions refers to liquid hydrocarbon compositions having greater than 35 wt % paraffin wax. Mid-wax liquid hydrocarbon compositions refer to liquid hydrocarbon compositions having between 20 and 35 wt % paraffin wax. Low-wax liquid hydrocarbon compositions refer to liquid hydrocarbon compositions having less than 25 wt % paraffin wax. Paraffin wax, as used herein, encompasses long chain alkanes having greater than 15 carbon atoms, or 20 carbon atoms, and in some embodiment between 16 and 60 carbon atoms, or 18 and 50 carbon atoms, or 20 and 40 carbon atoms. These paraffin waxes are solids at room temperatures and tend to agglomerate in liquid hydrocarbon compositions, causing flowability issues.

The type and amount of OLAC composition that will be used to improve the flow properties of the liquid hydrocarbon composition generally will be the type and amount which is effective to provide the desired changes in the flow properties of the liquid hydrocarbon. The type and amount will depend on certain factors including the concentration and nature of the paraffin wax in the liquid hydrocarbon, and the lowest temperature that will be attained by the liquid hydrocarbon during the time that flowability is important.

To determine the appropriate hydrocarbyl group length, one of ordinary skill in the art would expect to employ empirical understanding. In one embodiment, the type and amount of wax in the liquid hydrocarbon can be analyzed, and a hydrocarbyl group, such as an alkyl, aryl or aminoalkyl group, of the same length as the average length of the wax can be employed in the composition. In another embodiment, the type and amount of wax in the liquid hydrocarbon can be analyzed, and an olefin of the same average length as the average length of the wax can be employed in the composition. In a further embodiment, the type and amount of wax in the liquid hydrocarbon can be analyzed, and the average length of the combination of olefin and hydrocarbyl group, such as an alkyl, aryl or aminoalkyl group, that matches the average length of the wax can be employed in the composition.

Generally, the average length of the paraffins in the liquid hydrocarbon should be matched by the average length of either the alpha olefin in the OLAC composition, the hydrocarbyl group, for example, the alkyl group, aminoalkyl group, or aryl group of the hydrocarbyl(meth)acrylic acid derivative, or a combination thereof. Because paraffins are long chain hydrocarbons, a preferred embodiment of the OLAC composition to be employed in a liquid hydrocarbon composition will have longer chain hydrocarbons.

In one embodiment, the minimum number of carbon atoms for the at least one alpha olefin is 14. In another embodiment, the minimum number of carbon atoms for the hydrocarbyl group, for example, the alkyl, aminoalkyl or aryl group of the hydrocarbyl(meth)acrylic acid derivatives is 14. In a further embodiment, when the hydrocarbyl group, (e.g. the alkyl, amine or aryl group) of the hydrocarbyl (meth)acrylic acid derivatives comprises less than 16 carbon atoms, the at least one alpha olefin comprises greater than 16 carbon atoms. In another embodiment, when the at least one alpha olefin comprises less than 16 carbon atoms, the hydrocarbyl group (e.g. alkyl, amine or aryl group) of the hydrocarbyl(meth)acrylic acid derivative of a) comprise greater than 16 carbon atoms. Preferably the average length of the alpha olefin matches the average length of the hydrocarbyl group of the (meth)acrylic acid derivative and matches the average length of the paraffin wax in the liquid hydrocarbon composition.

The amount of OLAC composition in the liquid hydrocarbon generally will range from at least about 0.001% by weight to as high as about 1 or 2% by weight. Generally, however, a range of from about 0.003 to about 0.01 or even 0.3% by weight is sufficient to impart a desired level of flow improvement and pour point depressancy to the liquid hydrocarbons. Higher levels, e.g., 1.0% or higher can be used but these levels are uneconomic.

The OLAC compositions can be fluidized in solvent or diluent carriers. The combination of one or more fluidized OLAC compositions and a solvent or diluent carrier is referred to herein as a concentrate composition. The concentrate compositions of this invention are especially advantageous for storing, transport and addition of the OLAC composition to liquid hydrocarbons. The OLAC composition can comprise up to about 80% or higher by weight of the total concentrate composition, more usually from about 20% to about 50% by weight, of the total weight of the concentrate composition.

The terminology "fluidized" as used herein is intended to refer to solutions, suspensions or emulsions of the OLAC composition in solvent or diluent carriers. While some settling or separation over a period of time of the fluidized OLAC composition normally can be tolerated in the concentrate compositions contemplated herein, it is usually preferred that most of the OLAC composition either be dissolved, or uniformly dispersed in the form of a stable suspension, in the solvent or diluent carrier. The fluidized nature of the OLAC composition in the solvent or solvent carrier will be readily apparent to those in the art.

The balance of the concentrate composition, i.e., the solvent or diluent carrier, is normally comprised of one or more normally liquid solvents or diluents, referred to herein as solvent or diluent carriers. These solvents or diluents are substantially inert, (i.e., do not react with the OLAC composition or the oil to which it is to be added, to any appreciable extent) normally liquid, organic materials. The solvent or diluents can be selected from a wide range of materials and may include unreacted monohydric alcohols and reaction media, as above described, low boiling solvents, mineral oils, and the like. Also, the particular liquid hydrocarbon to which the concentrate is to be added may also be used alone or in combination as a solvent or diluent carrier. Most usually, combinations of these solvent or diluent carriers will be employed. Examples of low boiling solvent or diluent carriers include aromatic hydrocarbons, aliphatic hydrocarbons, chlorinated hydrocarbons, ethers, alcohols and the like such as benzene, toluene, xylene, heptane, octane, dodecane, cyclohexane, methylcyclohexane, kerosene, chlorobenzene, heptyl chloride, 1,4-dioxane, propyl ether, cyclohexanol, ethyl n-amyl ether as well as mixtures of two or more of these. Typically useful solvent or diluent carriers are xylene, toluene, mineral oil and combinations thereof.

The concentrate may contain other additives such as gas hydrate inhibitors (often known as freeze point depressant) including methanol; drag reducers; scale inhibitors including phosphate esters; rust inhibitors, such as but not limited to amines like morpholine and alkanolamines, phosphorous and phosphoric acid derivatives such as mono and diesters and amine or metallic salts of phosphoric and phosphorous acid; antioxidants including but not limited to phenate sulfides, phosphosulfurized terpenes, sulfurized esters, aromatic amines, and hindered phenols;and the like which are desired to be incorporated into the liquid hydrocarbons. These additional additives and their formulations into oil compositions are well known in the art. Likewise, the concentrate may further include one or more additional wax control polymers (including wax crystal modifiers and wax dispersants, such as ethylene vinyl acetate, fumarate vinyl acetate, styrene-maleic copolymers, copolymer esters or alkyl phenol resins), asphaltene control polymers, for example, such as those disclosed in U.S. Pat. No. 7,795,183 to Wilkes, et al., issued Sep. 14, 2010, and the like, or mixtures thereof.

The total combined amount of the other performance additive compounds present on an oil free basis in ranges from about 0 wt % to about 25 wt %, in another embodiment about 0.0005 wt % to about 25 wt %, in another embodiment about 0.001 wt % to about 20 wt % and in yet another embodiment about 0.002 wt % to about 15 wt % of the concentrate. Although one or more of the other performance additives may be present, it is common for the other performance additives to be present in different amounts relative to each other.

In accordance with this invention, the flow properties of liquid hydrocarbons can be improved by the addition thereto of a small amount of an OLAC composition in fluidized form as described above. When suitable OLAC compositions as described above are incorporated into liquid hydrocarbons in sufficient amounts, the pour point, plastic viscosity and yield value of the liquid hydrocarbon, particularly the high wax or waxy liquid hydrocarbons, can be reduced significantly. The reduction in the values for these properties indicates a treated liquid hydrocarbon having improved flow properties.

A suitable OLAC composition for a particular hydrocarbon composition can be determined, as described above, by matching carbon lengths of the olefin and/or acrylate with the paraffin wax length in the liquid hydrocarbon composition. However, in some instances the average length of the paraffin wax in the liquid hydrocarbon composition cannot be easily analyzed. In such instances it is well within the level of those of skill in the art to evaluate the effectiveness of a particular OLAC composition in a particular liquid hydrocarbon composition. For instance, the choice of an effective OLAC composition in a chosen liquid hydrocarbon composition can be readily determined with minimal experimentation by comparing viscosity changes in a sample blend of an OLAC composition in a hydrocarbon composition versus the neat liquid hydrocarbon composition. An example analysis could encompass: 1) conditioning the samples in an oven at an elevated temperature, for example, of about 90° C., overnight, 2) employing a rheometer to determine the viscosity profile of the samples by performing a temperature sweep over a chosen temperature range, for example, from 60° C. to 0° C., at a chosen constant shear rate, for example of 30 s$^{-1}$, and 3) recording the temperature at which the viscosity of the samples hits an inflection point. If the wax inhibitor is active in the blended sample then the temperature of the blended sample at the same viscosity inflection point found for the neat sample should be reduced compared to the neat sample, indicating that the wax crystals and lattice development in the blended sample is inhibited.

Likewise, the pour point of both treated and untreated liquid hydrocarbons can be determined by ASTM procedure D 5853 and/or D 97 and compared. If the pour point of a blended sample is lower than the pour point of the neat sample than the OLAC composition can be considered effective in the particular liquid hydrocarbon composition.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

It is known that some of the materials described above may interact in the final formulation, so that the components of the final formulation may be different from those that are initially added. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

Sample A

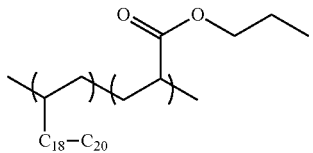

Formula A

A long chain olefin-butyl acrylate polymer believed to be of Formula A is sought in the following manner. A 200 g sample of a pre-melted $C_{20-22}$ linear olefin is charged to a 1 liter flange flask fitted with a mechanical stirrer, condenser, nitrogen line and mantle/thermocouple/temperature controller system. The sample is heated to 90° C. with agitation while a 347.8 g sample of butyl acrylate and 7.34 g of an organic peroxide initiator are charged to the flask over ~2 h. During addition the reaction became more viscous. Two exotherms are observed, one at 35 minutes and one at 120 minutes. Upon completion of the addition, the reaction is held at 90° C. for two hours. An additional 2.44 g of initiator is added and the reaction is held for an additional 2 hours. The reaction mixture is heated to 100° C. and vacuum applied to remove any unreacted butyl acrylate. The reaction is then heated to 150° C. and held for 2.5 h. The resulting material, is cooled and filtered. 489 g of a colorless material is collected. Analysis by GPC and GC indicated unreacted olefin levels of approximately 7% of the initial charge.

Sample B

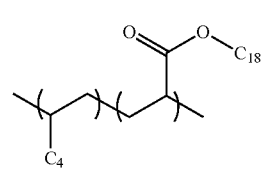

Formula B

A hexene-octadecyl acrylate olefin-acrylate polymer believed to be of Formula B is sought in the following manner. 160 g of hexene is charged to a 1 liter flange flask which is fitted with a mechanical stirrer, condenser, nitrogen line and mantle/thermocouple/temperature controller system. The reaction is heated to 65° C. with agitation. 308.53 g of pre-melted octadecyl acrylate and 10.29 g of an organic peroxide initiator are charged to the flask over ~2 h. Upon completion of the addition, the reaction is held at 65° C. for 2 h. An additional 3.43 g of initiator are added after the hold and the mixture is held for an additional 2 hours. A final additional 3.43 g of initiator is added after the second hold and the mixture is held for another 16 h. The reaction is then vacuum distilled to remove any unreacted hexene. Once the vacuum is applied, the reaction is held at 115° C. for 1.5 h. 275 g of a colorless material is collected. Analysis by GPC and GC indicated no residual hexene or octadecyl acrylate.

Sample C

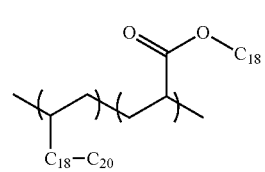

Formula C

A long chain olefin-octadecyl acrylate olefin-acrylate polymer believed to be of Formula C is sought in the following manner. A 200 g sample of a pre-melted $C_{20-22}$ linear olefin is charged to a 1 liter flange flask fitted with a mechanical stirrer, condenser, nitrogen line and mantle/thermocouple/temperature controller system. The reaction is heated to 90° C. with agitation. 317.04 g octadecyl acrylate and 6.61 g of an organic peroxide initiator are charged to the flask over ~2 h. 30 minutes into the addition, the reaction changes from colorless to pale yellow and becomes more viscous. 60 minutes into the addition an exotherm was observed. Upon completion of the addition, the reaction is held at 90° C. for 2 h. 2.2 g of additional initiator is charged to the reaction, and the reaction is held a further 2 h. Another 2.2 g portion of initiator is charged to the reaction, and the reaction is held for another 17 h. After the 17 h hold, the reaction is cooled. 469 g of a colorless material is collected. Analysis by GPC and GC indicated unreacted olefin of about 14.5% and 20% of the initial charge, respectively.

Sample D

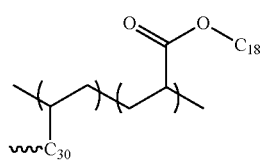

Formula D

A long chain olefin-octadecyl acrylate olefin-acrylate polymer believed to be of Formula D is sought in the following manner. A 180 g sample of a pre-melted $C_{30}+$ olefin is charged to a 1 liter flange flask fitted with a mechanical stirrer, condenser, nitrogen line and mantle/thermocouple/temperature controller system. The reaction is heated to 90° C. with agitation and 328.9 g of octadecyl acrylate and 4.39 g of an organic peroxide initiator are charged to the flask over ~2 h. 60 minutes into the addition, the reaction exothermed. The additions are stopped until the peak temperature is reached, then the additions are restarted. Upon completion of the addition, the reaction is held at 90° C. Three additional 2.2 g portions of initiator are charged to the reaction at 2 h intervals, prior to the reaction being held overnight (~17 h). After the hold, the reaction is cooled. 469 g of a colorless material is collected. Analysis by GPC and indicated unreacted olefin of about 15.6% of the initial charge.

Comparative Polyacrylate

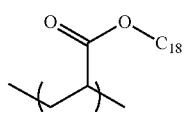

Formula E

A poly(octadecyl acrylate) polymer believed to be of Formula E is sought in the following manner. A 120 g sample of premelted octadecyl acrylate, 128 g mineral oil, 4 g of an organic peroxide initiator, and 4 g N-dodecylmercaptan are charged to a 500 ml flange flask fitted with a mechanical stirrer, condenser, nitrogen line and mantle/thermocouple/temperature controller system. The reaction is heated slowly with agitation to 75° C., where the reaction begins to exotherm. Cooling is applied to steady the mixture at 75° C., and the reaction is heated slowly to 90° C. The reaction is held at 90° C. for 2.5 h, at which time an additional 1.33 g of initiator is added, followed by another 1.33 g one hour later. 254.9 g of a colorless material is collected. Analysis by GPC and GC indicated no unreacted monomer.

Example 1

The samples have been evaluated in a range of difficult to treat waxy crude oils from Africa and China, as well as a crude of unkown origin, all with a high paraffin content (high wax crude oil) to determine their efficacy as wax inhibitors. The wax content of the crude oils used for the evaluation were in the range of 20 to 40%.

The crude oil was evaluated un-additised and dosed with additive. Prior to analysis the blended sample was conditioned in the oven at 90° C. overnight to remove all possibility of nucleation points being present at the start of test. The AR2000 rheometer was then used to determine the viscosity profile by performing a temperature sweep from 60° C. to 0° C. at a constant shear rate of 30 $s^{-1}$ using the environmental test chamber with a 25 mm flat plate stainless steel geometry. At the point of wax lattice formation the viscosity increases dramatically. If the wax inhibitor is active then the inflection point should be delayed as the wax crystals and lattice development is inhibited.

To generate comparative data the temperature point ("T at Comparison

|  | Crude 1 | Crude 2 | Crude 3 | Crude 4 | Crude 5 | Crude 6 |
|---|---|---|---|---|---|---|
| Region | Africa | Africa | China | China | Unknown | Unknown |
| Wax Content | >35% | 30 | 16 | 15 | Unknown | Unknown |
| Pour Point | 40 | 48 | 36 | 33 | 21 | 27 |
| Comparison Viscosity, Pa·s | 2 | 1 | 1 | 1 | 0.5 | 1 |
| T at Comparison Viscosity, ° C. | 37.5 | 47.3 | 35.2 | 40.9 | 27.3 | 39.4 |
| Treat rate, ppm | 10,000 | 5,000 | 5,000 | 5,000 | 3,000 | 1,000 |
| Improvement over un-additised crude ||||||| 
| Material B | 1.8 |  |  |  |  |  |
| Material C | 3.2 | 1.7 | 5.0 | 5.4 | 3.3 | 8.8 |
| Material D | 1.3 | 2.8 | 6.2 | 6.4 |  | 6.6 |

Viscosity, ° C.") at which the sample reaches a given viscosity ("Comparison Viscosity, Pa·s") is taken. Results are provided in the table below.

It is not expected that every OLAC composition disclosed herein will be effective for every liquid hydrocarbon composition. For example, it has been found that samples C and D did not provide significant improvement in a sample high wax Indonesian crude, or provide improvement in a waxy fuel oil prepared in a coal to liquid process. However, overall we have found that OLAC compositions surprisingly can provide an improvement in flowability in wax containing liquid hydrocarbon compositions, often better than what can be provided by traditional flow improvers.

Each of the documents referred to above is incorporated herein by reference. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What is claimed is:

1. A composition comprising (a) at least one OLAC composition consisting of a reaction product of (a)(1) at least one alpha olefin, and (a)(2) at least one hydrocarbyl (meth)acrylic acid derivative, wherein the derivative is at least one amide, and (b) a hydrocarbon solvent, wherein the reaction product of (a) comprises from about 1 to about 49 wt % of the at least one alpha olefin of (a1) and from about 51 to about 99 wt % of the at least one hydrocarbyl (meth)acrylic acid derivative of (a2).

2. The composition of claim 1 wherein the reaction product comprises at least one of a block, alternating, or random copolymer.

3. The composition of claim 1 wherein the at least one alpha olefin (a1) comprises from 2 to about 50 carbon atoms.

4. The composition of claim 1 wherein the hydrocarbyl group of the at least one hydrocarbyl (meth)acrylic acid derivative of (a2) contains from 4 to about 50 carbon atoms.

5. The composition of claim 1 wherein the at least one hydrocarbyl (meth)acrylic acid derivative is an alkyl(meth) acrylic acid derivative, aminoalkyl(meth)acrylic acid derivative, aryl(meth)acrylic acid derivative, or combination thereof.

6. The composition of claim 3 wherein when the hydrocarbyl group of the hydrocarbyl (meth)acrylic acid derivative, comprises less than 16 carbon atoms, the at least one alpha olefin comprises greater than 16 carbon atoms.

7. The composition of claim 3 wherein when the at least one alpha olefin comprises less than 16 carbon atoms, the hydrocarbyl group of the hydrocarbyl (meth)acrylic acid derivative, comprises greater than 16 carbon atoms.

8. The composition of claim 1 wherein the derivative of the at least one hydrocarbyl (meth)acrylic acid derivative is at least one ester.

9. The composition of claim 1 wherein the derivative of the at least one hydrocarbyl (meth)acrylic acid derivative is a combination of at least one ester and at least one amide.

10. The composition of claim 1 wherein (a)(1) is a C18-22 olefin and (a)(2) is a C18-22 alkyl (meth)acrylate.

11. The composition of claim 1, further comprising (c) a liquid hydrocarbon.

12. A method of depressing the pour point of a liquid hydrocarbon composition comprising adding to the liquid hydrocarbon composition an OLAC composition suitable to depress the pour point of the liquid hydrocarbon composition consisting of a reaction product of (a1) at least one alpha olefin, and (a2) at least one hydrocarbyl (meth)acrylic acid derivative, wherein the derivative is at least one amide, and wherein the reaction product of (a) comprises from about 1 to about 49 wt % of the at least one alpha olefin of (a1) and from about 51 to about 99 wt % of the at least one hydrocarbyl (meth)acrylic acid derivative of (a2).

* * * * *